(12) United States Patent
Obermueller et al.

(10) Patent No.: US 7,062,720 B2
(45) Date of Patent: Jun. 13, 2006

(54) METHOD AND SYSTEM FOR PROCESSING WAIT WINDOW INFORMATION

(75) Inventors: Klaus Obermueller, Nagold (DE); Sebastian Wedeniwski, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/171,492

(22) Filed: Jun. 13, 2002

(65) Prior Publication Data

US 2002/0191025 A1    Dec. 19, 2002

(30) Foreign Application Priority Data

Jun. 19, 2001    (EP) .................................. 01114628

(51) Int. Cl.
*G06F 3/00*    (2006.01)
*G06F 11/00*    (2006.01)

(52) U.S. Cl. ...................... 715/772; 715/781; 719/315; 719/318; 340/309.15

(58) Field of Classification Search ................ 715/700, 715/764, 772, 781; 719/313, 315, 318; 340/309.16, 340/309.15

See application file for complete search history.

(56) References Cited

U.S. PATENT DOCUMENTS

| | | | |
|---|---|---|---|
| 6,038,588 A * | 3/2000 | Nagarajayya et al. | 718/102 |
| 6,212,577 B1 * | 4/2001 | Stern et al. | 719/329 |
| 6,480,883 B1 * | 11/2002 | Tsutsumitake | 709/203 |
| 6,799,286 B1 * | 9/2004 | Evans et al. | 714/57 |
| 6,850,995 B1 * | 2/2005 | Shishizuka et al. | 710/20 |

OTHER PUBLICATIONS

Brad A. Myers, "The Importance of Percent-Done Progress Indicators for Computer-Human Interfaces", Apr./1985, CHI' 85 Precedings, Department of Computer Science University of Toronto, Canada, ACM.*

* cited by examiner

*Primary Examiner*—X. L. Bautista
(74) *Attorney, Agent, or Firm*—William A. Kinnaman, Jr.

(57) ABSTRACT

In order to avoid unnecessary and/or too shortly displayed wait window information occurring when a program is run on a highly performing hardware it is proposed to check whether a task which causes the display of the wait window information has completed after a predetermined first time interval after start of the task, and not to display the wait window information if the task has already completed within the first time interval, and otherwise display the wait window information at least during a predetermined second time interval, even if the task has already completed within the second time interval. Advantageously, the features can be implemented into an operating system. The advantage is that the flickering appearance of so-called wait windows is avoided.

18 Claims, 2 Drawing Sheets

METHOD AND SYSTEM FOR PROCESSING WAIT WINDOW INFORMATION

BACKGROUND OF THE INVENTION

1. Field of the Invention

The present invention relates to a method and system for processing wait window information, for example the display of so-called "wait windows".

2. Description of the Related Art

When a program is run on a computer the program does one or more jobs, i.e. fulfills the work that is defined by the underlying program instructions.

A job can be simple and short to be done, for example an addition of two integer numbers. But the job can also be very complex and the time period required for the computer to complete the job may be long, for example 20 seconds. When the program is to be used with a person, i.e. has a man-machine interface such as display facilities and entering facilities, then during the above-mentioned longer time periods required for doing a job usually some wait window information, as for example a wait window, is displayed to the user in order to inform him about the fact that a particular job may last some time in order to avoid the impression that the computer is inactive, as for example when the program has entered an endless loop. Such wait windows are used very frequently, for example while installing a new piece of software on a computer. Wait window information of this type is also referred to herein as "non-modal" information (NMI), since its purpose is merely to inform the user and not to elicit a response.

Nowadays, commercially available computers or computing devices offer different levels of computing performance. At the low end there are handheld computers or handheld computing devices, as e.g. organizers, mobile phones, smart phones and the like and personal computers (PCs) several years old having a clock speed of less than 100 megahertz (MHz). On the other hand, clock speeds of more than 1 gigahertz (GHz) are provided on a modem state-of-the-art PC. Thus, in a standalone situation the above-mentioned wait window may be displayed, for example, during 3 seconds when a given program is run on a 100-MHz PC, whereas it will be displayed for only 0.3 seconds when the program is run on a 1-GHz PC. Of course, the precise time periods may differ to some degree due to a plurality of side effects. Such a short display of wait windows, or more generally display of wait window information—i.e., information whose display does not require any user reaction such as doing a user input or the like—is usually confusing to the person who is confronted with the short display. This holds even more when the person is confronted with short displays during longer periods or during his total working time in a working day.

Further, the above-described problem situation producing the above-mentioned short time displays occurs in many other situations: for example, an application program may access a database. During the read access or a write transaction into the database, often such a wait window is displayed to the user. The wait window disappears when the access has completed. In a situation in which the database is quite empty the access time will be short, whereas it will be longer when the database is filled up with data. Thus, simply avoiding the display of wait windows does not improve the man-machine interface because the wait window transports useful information to the person dealing with the program, supposing the program task which is the reason for displaying the wait window is running at least some seconds or the like before it completes. The problem is that in most cases a task run time can hardly be predicted. Amongst the above-mentioned technical problems of different computing resources or different access times to databases or similar data management systems, other important technical facilities may increase or decrease the time period in which a given program task can complete; even in a standalone PC a plurality of tasks may run concurrently. In a networked computing device the arrival of data may be delayed when the network traffic is large. When the transmitted data is needed for completing the task the task period is dependent on the transmission time. This effect makes the situation quite complex because it is a basic aim of any software development to offer one and the same piece of software to as many clients, platforms and operating systems as possible.

Finally, a further factor should be mentioned which also contributes to the difficulty to predict any given task period: modern computer languages such as Java are platform-independent and thus basically adapted to produce Internet applications. In particular, the Java language has been developed very rapidly in the last few years so that modem Java programs run much quicker than older versions. (Java is a trademark of Sun Microsystems, Inc.)

SUMMARY OF THE INVENTION

It is thus an object of the present invention to improve the man-machine interface of software programs.

This object of the invention is achieved by the features set forth in the appended independent claims. Further advantageous arrangements and embodiments of the invention are set forth in the respective subclaims. Reference should be made to the appended claims.

In its broadest aspect, the present invention contemplates a method for processing wait window information referring to a given computing task in a program run in which the task duration is not per se predictable. The invention comprises the steps of: a) checking whether the task has completed after a predetermined first time interval has passed after start of the task; b) not displaying the wait window information if the task has already completed within the predetermined first time interval; c) otherwise, displaying the wait window information at least during a predetermined second time interval after the checking step, even if the task completes within the second time interval.

The advantage of the invention is that, independently of hardware performance, software, or network influence on the respective computing device which is used for running the program, a disturbing, too short display of wait window information is avoided. The concept is very general and can easily applied in any type of hardware/software combination, i.e., from highly performing workstations to small handheld computing devices with more or less strictly reduced computing resources.

Further, when the method is implemented in an operating system of a computing device and the overlying (application) program just provides a call to the new operating system function as e.g., OS-Comfort-Display( ), then the application program developer is not at all confronted with the problem underlying the present invention, as the processing of wait window information is processed by the underlying operating system itself. The programmer just needs to call a respective operating system function.

Even more advantageously, when the inventive method is extended such that the step of not displaying the wait window information comprises the step of suppressing the display of the information originally instructed by the program run, then no changes need to be done to existing programs. In this case an additional function is exclusively implemented into the operating system or other interposed equivalent calling procedure, while taking advantage of the invention to leave the overlying software unchanged. Indeed, the former version of application program may further invoke the display of wait window information. The invocation, however, will then be intercepted by the operating system or other interposed function and will be made ineffective according to this aspect of the invention.

In case of a wait window information display pipeline accumulated during a program run, the method of the invention may further comprise the step of suppressing remaining wait window information in the pipeline that has not yet been displayed when modal information is to be displayed by a current program instruction. When this is done, nearly no time is lost for running the program even in tricky constellations in which a large sequence of NMI displays follow each other, thus setting up an NMI display pipeline. This might occur during a program run when several subsequent cases A (see later below) and NMI displays may diverge in time.

When the inventive method further comprises the step of synchronizing continuation of the program run following an end of the task with an end of the display, then an NMI display pipeline will not even result in such constellations because the program run and the NMI display do not diverge in time. This could, e.g., be done by the operating system, which has read access to the time the task or the NMI display has completed.

Of course, any hardware system can take profit from this invention. The business value is the higher the more rapidly the performance of computing devices increases, the more rapidly program languages such as the Java language, for example, are improved to build up quicker running programs. In the particular Java case in which the same piece of software—as, e.g., an Internet Java applet or Java application—is intended to be usable on a variety of different hardware/software platforms, the present invention may produce its largest range of advantages: The concept is basically the same for any type of hardware in use.

BRIEF DESCRIPTION OF THE DRAWINGS

The present invention is illustrated by way of example and is not limited by the shape of the figures of the drawings in which.

DESCRIPTION OF THE PREFERRED EMBODIMENT

Figure 1:
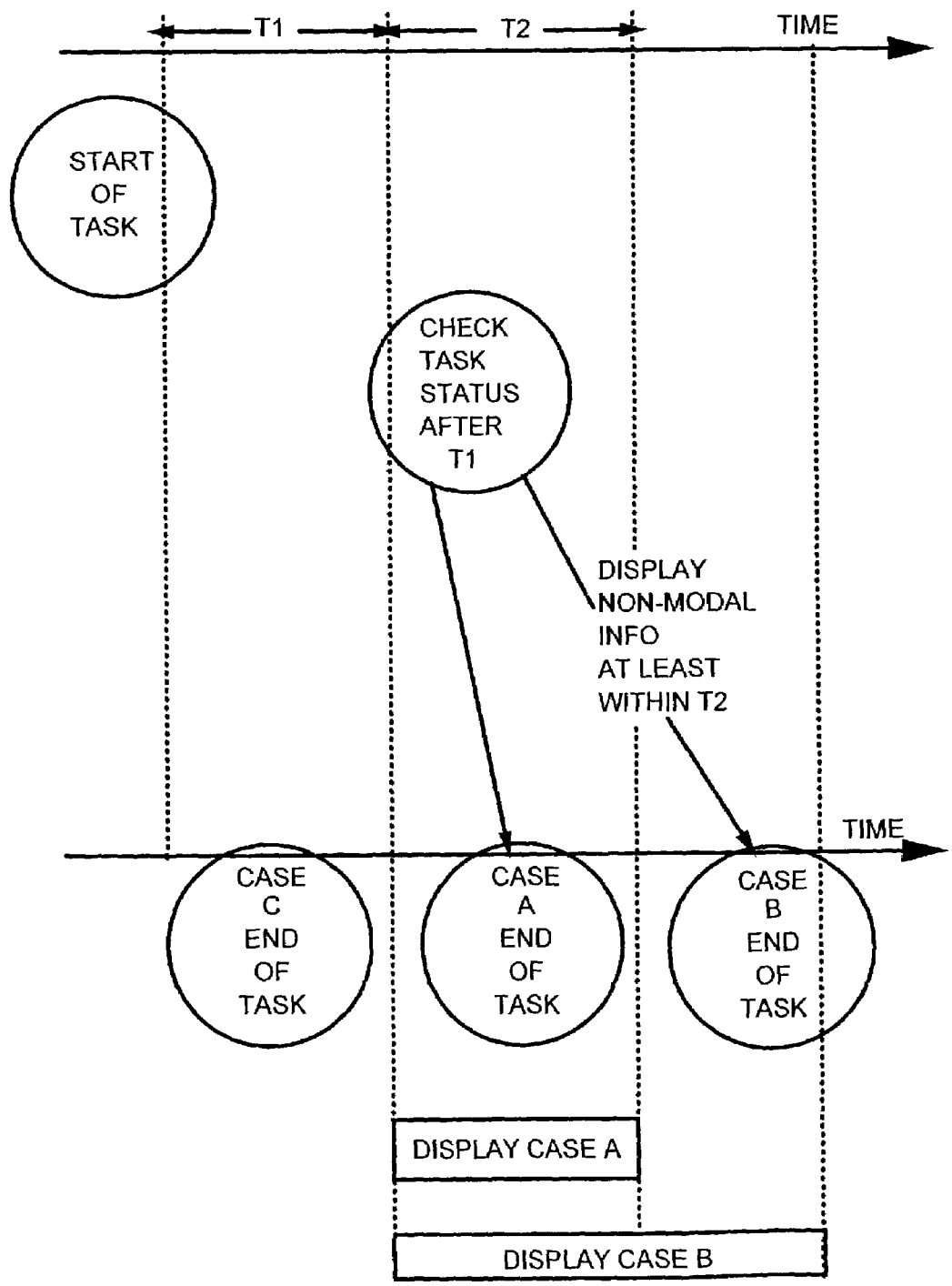
FIG. 1 is a schematic representation of a timetable with the most important points in time during use of the method of the invention.

With general reference to the figures and with special reference now to FIG. 1, some basic points in time as well as display duration times are given in order to illustrate the very principle of the present invention. Time increases from left to right and the fact that there are two different time axes depicted just helps to provide more clarity in the drawing.

The scenario begins with the start of a particular task. This could be, for example, to scan a hard disk of a personal computer for viruses or different occurrences of other subject matter. Then it is assumed that the task has not completed nor has been aborted after a given time period T1 after start of the task. Thus, if the start of the task begins at T=0 seconds then, for example, if T1=5 seconds then at T=5 seconds the current task status will be checked by the exemplarily given function incorporating the inventive embodiment.

Then case A will be considered first:

In case A the point in time at which the above-mentioned task ends is within a second time interval T2. T2 is here defined to begin with the end of T1 and is exemplarily assumed to have a duration of 3 seconds. Thus, as depicted in the drawing after nearly 2 seconds within the interval T2 the end of the task is found. Then, according to a preferred aspect of the present embodiment, the NMI, for example a wait window, is displayed from the beginning of T2 until the end of T2. It should be stressed that according to this preferred embodiment a too short display within T2 is avoided. This is the reason to keep the display visible even if the underlying task has already completed. The same, of course, is true when the task should be aborted. Thus, in case A the wait window will be displayed during the assumed T2 length of 3 seconds. This duration, however, is long enough in most cases in order to be read by a person in case not too much information is displayed, such as for example " . . . please wait. . . "

Case B, however, is characterized by the fact that the end of the task is some time after the given time interval T2 has finished. This situation is assumed to be the "regular" case in which the actual end of the task determines the end of the display of the wait information. Thus, when the task completes, for example 5 seconds after the end of T2, the display of the wait window is begun at the beginning of T2 and lasts until T=3+5=8 seconds.

As can easily be appreciated from FIG. 1, in a case C which reflects a task which has already completed before T1 ends, no display of wait information is issued at all.

Figure 2:
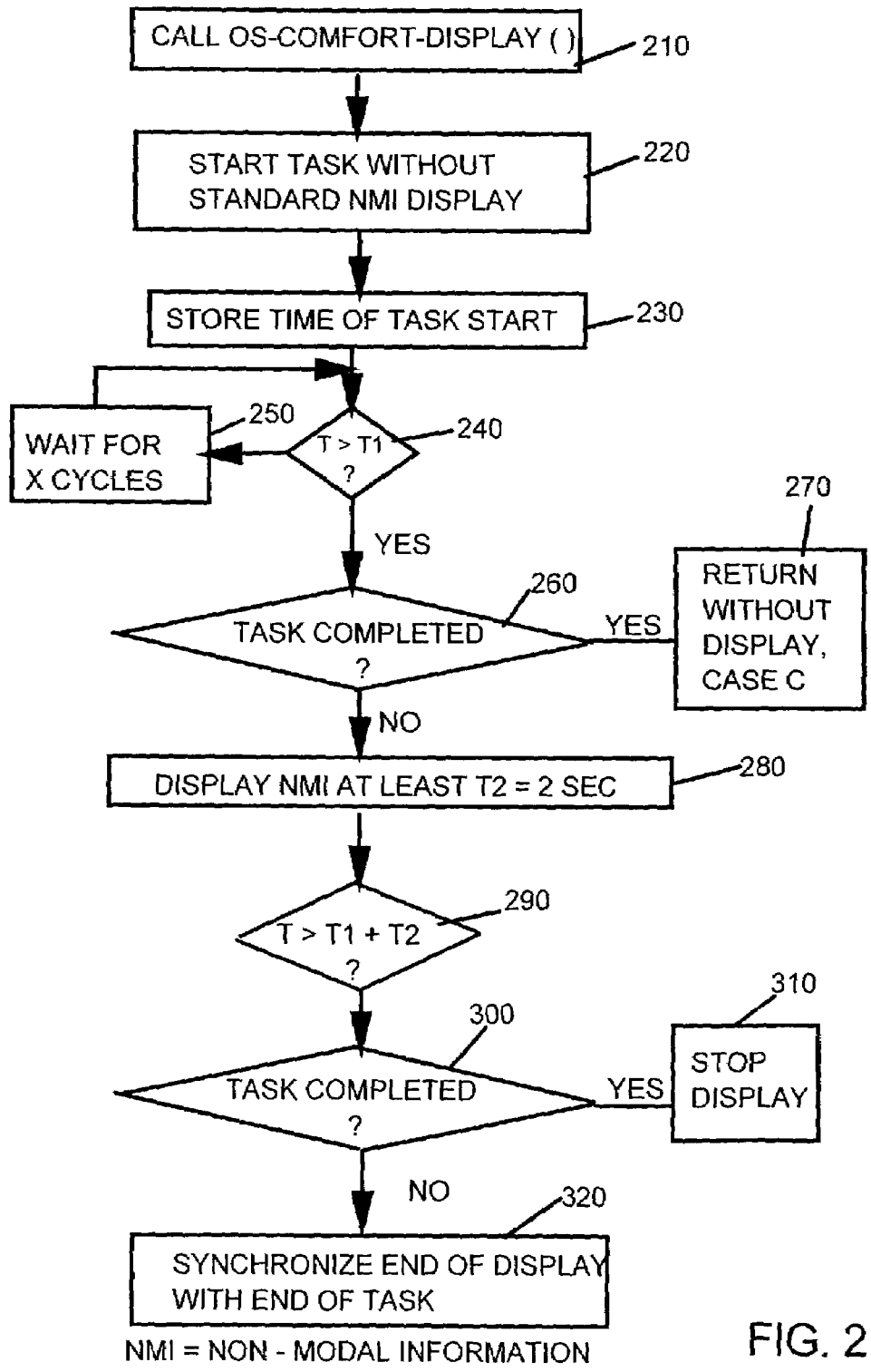
FIG. 2 is a schematic representation of essential steps within an embodiment of the invention illustrating the control flow thereof.

With reference now to FIG. 2, the most essential steps in the control flow of the preferred embodiment associated with FIG. 1 will be described next below.

In a first step 210 a function of the invention, named exemplarily OS-COMFORT-DISPLAY( ) is called. In this particular case this function is assumed to form part of the operating system (OS).

Then, in a step 220, some particular task is started without an explicit standard NMI display as is usually done in the prior art.

Then, in a next step 230, the time of task start is stored, for example by the above-mentioned function OS-COMFORT-DISPLAY. OS-COMFORT-DISPLAY is implemented as a watchdog program that checks at step 240 whether the time after task start is larger than T1. For this purpose, OS-COMFORT-DISPLAY is coupled to the computer clock. A decision results from the time check at step 240. In the NO branch of it the OS-COMFORT-DISPLAY function waits for a number of X cycles at step 250 and performs the same check 240 again. At some point in time T will be greater than T1. In this case the YES branch is entered and the inventive function OS-COMFORT-DISPLAY will check in step 260 whether the underlying task has already completed. In the YES branch of step 260 we arrive at case C in FIG. 1. In this case, the inventive function returns at step 270 without displaying any wait information.

If, on the other hand, the task is not completed at step 260, the NO branch thereof is entered. Then, in step 280, a standard NMI display of at least T2 duration (where T2=2 seconds in this particular example) is issued by the inventive OS-COMFORT-DISPLAY function. Alternatively, pre-specified individual waiting information may be issued as well at step 280.

The OS-COMFORT-DISPLAY function then checks at step 290 whether the actual clock is greater than T1+T2. When this happens (7 seconds after the start of the task if T1=5 seconds and T2=2 seconds), then the OS-COMFORT-DISPLAY function checks at step 300 whether the task has completed. In the YES branch of step 300 we arrive at case A depicted in FIG. 1. In this case the display of the waiting information is stopped immediately, step 310, and the function returns to the calling program. Otherwise, see case B in FIG. 1, the task has not yet completed. In this case the end of the display will be synchronized with the end of the task, step 320. This can be basically done as described above with reference to steps 240, 250 and 260. I.e., the inventive watchdog function repeatedly checks, for example in intervals of 100 cycles, whether the current task has completed and, when it has, terminates the display.

As is revealed from the above description of the control flow, the scenario given in FIG. 1, with a guaranteed minimum duration of display information independent of the actual computer performance, can be provided as an advantageous feature of the man-machine interface.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A utility according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for processing wait window information referring to a given computing task in a program run, the task having a duration that is not per se predictable, the method comprising the steps of:
    checking whether the task has completed after a predetermined first time interval has passed after start of the task;
    not displaying the wait window information if the task has already completed within the predetermined first time interval;
    otherwise, displaying the wait window information at least during a predetermined second time interval after the checking step, even if the task completes within the second time interval.

2. The method of claim 1, implemented in an operating system program of a computing device.

3. The method of claim 2 in which the step of not displaying the wait window information comprises the step of suppressing a display of the information originally instructed by the program run.

4. The method of claim 1, further comprising the step of:
    in case of a wait window information display pipeline accumulated during a program run, suppressing remaining wait window information in the pipeline that has not yet been displayed when modal information is to be displayed by a current program instruction.

5. The method of claim 1, further comprising the step of:
    synchronizing continuation of the program run following an end of the task with an end of a display of the wait window information.

6. The method of claim 1 in which said displaying step comprises the step of:
    synchronizing an end of a display of the wait window information with an end of the task if the task does not complete within the second time interval.

7. A computer program product stored on a computer usable medium comprising computer readable program means for causing a computer to perform the method of claim 1 when the computer program product is executed on a computer.

8. The computer program product of claim 7 in which the method is implemented in an operating system program of a computing device.

9. The computer program product of claim 8 in which the step of not displaying the wait window information comprises the step of suppressing a display of the information originally instructed by the program run.

10. The computer program product of claim 7 in which the method further comprises the step of:
    in case of a wait window information display pipeline accumulated during a program run, suppressing remaining wait window information in the pipeline that has not yet been displayed when modal information is to be displayed by a current program instruction.

11. The computer program product of claim 7 in which the method further comprises the step of:
    synchronizing continuation of the program run following an end of the task with an end of a display of the wait window information.

12. The computer program product of claim 7 in which said displaying step comprises the step of:
    synchronizing an end of a display of the wait window information with an end of the task if the task does not complete within the second time interval.

13. A system for processing wait window information referring to a given computing task in a program run, the task having a duration that is not per se predictable, the system comprising:
    means for checking whether the task has completed after a predetermined first time interval has passed after start of the task;
    means for not displaying the wait window information if the task has already completed within the predetermined first time interval; and means for displaying the wait window information at least during a predetermined second time interval after the checking step if the task has not already completed within the predetermined first time interval, even if the task completes within the second time interval.

14. The system of claim 13, implemented in an operating system program of a computing device.

15. The system of claim 14 in which the means for not displaying the wait window information comprises means for suppressing a display of the information originally instructed by the program run.

16. The system of claim 13, further comprising:
means for suppressing remaining wait window information in the pipeline that has not yet been displayed when modal information is to be displayed by a current program instruction in case of a wait window information display pipeline accumulated during a program run.

17. The system of claim 13, further comprising:
means for synchronizing continuation of the program run following an end of the task with an end of a display of the wait window information.

18. The system of claim 13 in which said displaying means comprises:
means for synchronizing an end of a display of the wait window information with an end of the task if the task does not complete within the second time interval.

* * * * *